United States Patent [19]
Grant

[11] Patent Number: 4,623,249
[45] Date of Patent: Nov. 18, 1986

[54] CONTAINER FOR AN OPTICAL ELEMENT
[76] Inventor: Alan H. Grant, 3208 Woodhollow Dr., Chevy Chase, Md. 20015
[21] Appl. No.: 543,115
[22] Filed: Oct. 14, 1983
[51] Int. Cl.$^4$ .......................... A45C 11/04; G01B 9/00
[52] U.S. Cl. ..................................... 356/124; 206/5.1; 356/244
[58] Field of Search ............... 356/124, 125, 126, 127, 356/244, 246; 206/5.1, 45.34; 383/66

[56] References Cited
U.S. PATENT DOCUMENTS

| 3,822,096 | 7/1974 | Wilms et al. | 356/124 |
| 3,917,391 | 11/1975 | Padula et al. | 356/124 |
| 3,985,445 | 10/1976 | Tagnon | 356/125 |
| 4,277,172 | 7/1981 | Richards | 356/125 |
| 4,415,076 | 11/1983 | Campbell | 356/124 |

FOREIGN PATENT DOCUMENTS 110757 5/1964 Czechoslovakia ................. 356/124

Primary Examiner—R. A. Rosenberger
Attorney, Agent, or Firm—Berman, Aisenberg & Platt

[57] ABSTRACT

A device for storing an optical element is disclosed. The device includes two sets of optical surfaces for allowing examination of an optical element in two directions. The device is preferably used for an element such as a soft contact lens and is filled with fluid. Two ensure that the chamber containing the lens is filled with fluid, an opening is displaced horizontally and vertically from the chamber to remain out of the optical viewing path and to be higher than the optical chamber to prevent formation of bubbles in the chamber.

14 Claims, 9 Drawing Figures

FIG. 4.
FIG. 5.
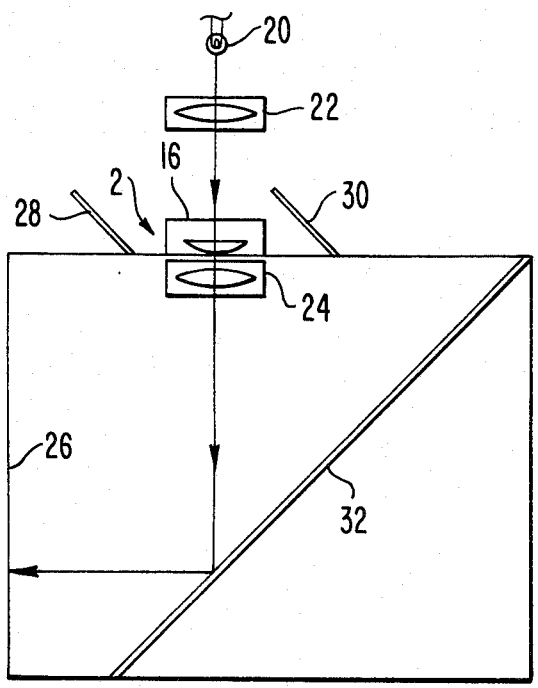
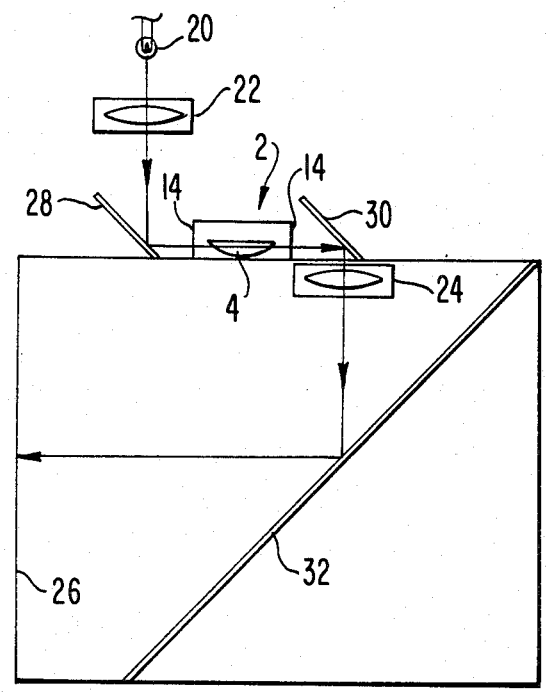
FIG. 6.
FIG. 7.
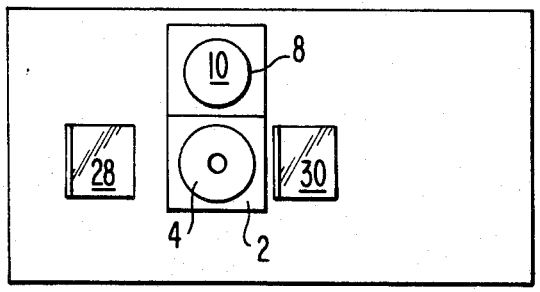
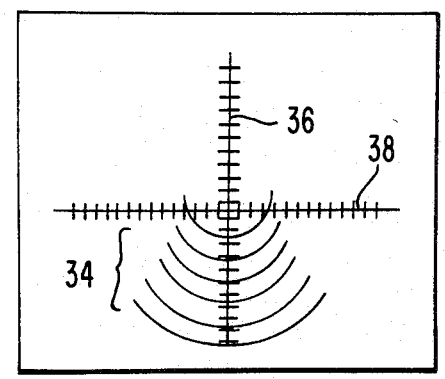

CONTAINER FOR AN OPTICAL ELEMENT

FIELD OF THE INVENTION

This invention relates to the art of containers, particularly containers for storing a contact lens, or an intra-ocular lens, and for allowing optical testing of the lens while it remains in the container.

BACKGROUND ART

It is known to store a contact lens, particularly a soft, hydrophilic contact lens, in a container filled with liquid. This method of storing a soft contact lens is used because if such a lens is allowed to dry, it will become brittle and will easily tear or break. An intra-ocular lens may also be made of a hydrophilic material, and these lenses are stored in a container of liquid for the same reason.

A typical container for storing a soft contact lens is a cylinder which is closed at one end and has a removable lid at its other end. The lens is placed in the container filled with liquid, such as saline solution. The container is then sealed and placed in an autoclave to sterilize the lens and the liquid.

U.S. Pat. Nos. 4,269,307 (LaHaye), 4,113,088 (Binkhorst), and 4,173,281 (Tought) teach packages for storing intra-ocular lenses. Each of the packages disclosed in these patents provides a window for permitting optical inspection of the lens by a surgeon prior to opening the package. The lenses are sterilized by ethylene oxide gas after the lens is placed in the package. None of these packages is capable of containing a liquid, and thus would not be useful for storing a hydrophilic lens.

U.S. Pat. No. 3,822,096 (Wilma) shows an apparatus for measuring the profile of a soft contact lens. The lens is located in an immersion vessel which is filled with a liquid. The index of refraction of the liquid is similar to the index of refraction of the contact lens to facilitate projection of an image of the profile. There is no suggestion that the immersion vessel may be sealed to store or transport the contact lens.

U.S. Pat. No. 3,917,391 (Padula et al.) shows a projection system for creating a profile of a soft contact lens. The lens is located in a liquid-filled chamber which is open at its top. Such a chamber is not useful for storing or transporting a contact lens.

SUMMARY OF THE INVENTION

While several of the containers described above are transparent and thus permit examination of the lens inside the container, these containers suffer from several disadvantages. A major drawback of the prior art liquid containers is the virtual impossibility of entirely filling the container to eliminate a void above the lens. The presence of this void prevents accurate examination of the lens in a vertical direction since the void causes large reflections and irregular refraction and causes an error in the optical power measurement depending upon the size and shape of the void.

Testing a lens stored in a prior art container typically requires the seal of the container to be broken and the lens to be removed. The lens is then tested for optical power, curvature, and defects. If the lens is satisfactory, it may be dispensed to a patient. On the other hand, if the lens is not satisfactory, it must be replaced in the container for storage or for return to the manufacturer. This process presents the substantial problem that the sterile seal has been broken and resterilization cannot be easily accomplished. Accordingly, the manufacturer may refuse to accept return of the lens, thus causing a loss to the practitioner. Furthermore, even if the practitioner chooses to maintain the lens in his inventory, it must be resterilized to prevent growth of bacteria during the time the lens is stored.

The inability to easily test the properties of the lens reduces the ability of the practitioner to maintain control over the quality and accuracy of a prescription. This is a disadvantage to the practitioner since he is responsible for proper treatment of his patient.

Furthermore, a hydrophilic lens is flexible, and its curvature is virtually impossible to measure unless it is suspended in a saline solution. If the lens is removed from the tube containing saline solution, the thickness and index of refraction of the lens will change and accurate measurement of the power of the lens will be prevented.

The invention is a container wherein the lens resides in a cavity formed by two sets of optical surfaces and wherein the container has an opening adjacent the cavity but vertically displaced from it. This arrangement causes the void, which always exists because it is virtually impossible to completely fill the container with liquid, to be adjacent and above the cavity containing the optical element. The result is that the cavity is entirely filled with liquid, and an optical examination of the lens in at least two directions may be easily performed.

The cavity in which the lens rests is preferably formed by a rectangular prism with two sets of parallel optical surfaces oriented orthogonally to each other. This arrangement permits the power of the lens to be easily measured, for example by a lensometer, through one set of optical surfaces and measurement fo the profile and plan view of the lens, for example by a projector, through both sets of optical surfaces. Since the cavity is completely filled with liquid, the problems caused by reflection and irregular refraction of light at the surface of the liquid and the inner surface of the prism wall, and the optical power of the air void are eliminated.

The container of the invention may preferably be used with a known optical testing instrument which permits the sequential testing of power, plan view and profile by simply moving the position of the light source.

When the profile of a lens is projected on a screen, it is preferable to provide indicia for comparing the projected image of the lens with standard profile curves and with linear scales for determining the cord length and sagital depth of the lens. these indicia may be provided on the projection screen itself, or they may be engraved on a surface of the container and an image thereof projected onto the screen along with the plan and profile image of the lens.

The invention facilitates measurement of the properties of an intra-ocular lens by a surgeon during eye surgery. The lens may be brought to the operating room in the container of the invention and examined before placement in the eye by any technique, such as the projection desribed above.

It is also possible to examine the physical structure of the lens by viewing the lens through a magnifying glass placed on the outer surface of the container.

In one embodiment, the container is substantially rectangular whereas in another embodiment the container includes oblique surfaces for reflecting an incident beam of light to pass through the lens at an angle to the direction of the incident beam. This second embodiment allows the container to be used in a wider variety of measuring instruments.

The container of the invention may be sterilized by the lens manufacturer and the lens may be tested without destroying the sterility. If the lens has the proper characteristics, the seal is broken and the lens is dispensed to the patient. On the other hand, if the tests show the lens not to be adequate, it may be returned to the manufacturer or stored since the sterility has not been destroyed.

The container of the invention finds particular utility for either soft contact lenses or intra-ocular lenses. As will be apparent to those of ordinary skill in the art, other optical elements such as hard (polymethyl methacrylate) or gas permable or glass may be stored in the container of the invention.

It is an object of this invention to provide a container for storing and testing an optical element.

It is a further object of this invention to provide a container for storing and testing an optical element wherein a cavity containing the lens is completely filled with a liquid.

It is a further object of this invention to provide a container for an optical element having reflective surfaces to permit testing the optical element by viewing the element in a plurality of directions.

BRIEF DESCRIPTION OF THE DRAWINGS

FIG. 4 is a schematic of the container of the invention located in a testing instrument where the lens is being tested for optical power.

FIG. 5 is a schematic of the container of the invention located in a testing instrument such that a profile of the lens is projected on a viewing screen.

FIG. 6 is a top view of the testing instrument shown in FIGS. 4 and 5.

FIG. 7 is an illustration of indicia which may be used on either a projection screen or the container for determining the profile of the optical element under test.

DETAILED DESCRIPTION OF THE INVENTION

Figure 1:
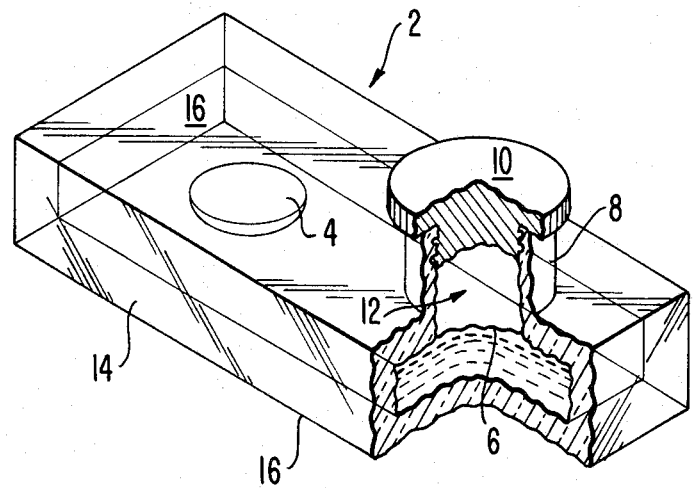
FIG. 1 is a perspective of the container according to the invention.

FIG. 1 shows a perspective of a first embodiment of the invention. A container 2 has a lens 4 therein. The lens may be a hydrophilic soft contact lens, a hydrophilic intra-ocular lens, or other liquid (polymethyl methacrylate) or gas-permeable, or glass optical element. The container 2 is filled with a liquid 6, which is preferably a saline solution, but may be any solution designed to maintain the properties of the lens 4. A cylindrical neck 8 provides communication with the interior of the container 2 and is sealed with a lid 10. The cylindrical neck 8 is located adjacent the portion of the container 2 which receives the lens 4 and extends above the container to provide a void 12. This void exists because it is almost impossible to completely fill any rigid container with liquid. For example, the entire container is typically sterilized by the manufacturer, and it may be necessary to have a small void to account for expansion and contraction due to temperature changes. Furthermore, it is extremely difficult and expensive to provide a mechanism for completely filling the container. The arrangement provided by the invention removes the necessity of completely filling the container, since the void 12 is located away from the portion of the container having the optical element 4. The void 12 is thus not in the optical path of the testing instrument and does not interfere with the test.

The container 2, shown in FIG. 1, has two sets of optical surfaces. A first set 14 comprises parallel optical surfaces which permit a measurement of the profile of the optical element 4 and will be described in more detail below. A second set of surfaces 16 comprises parallel surfaces which permit the measurement of the optical power of the optical element 4 as will be more fully described below.

Figure 2:
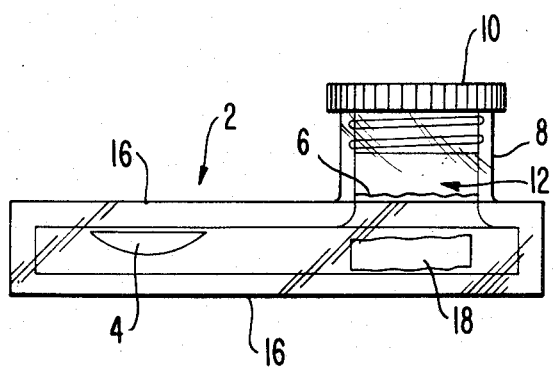
FIG. 2 is a side view of the container according to the invention.
Figure 3:
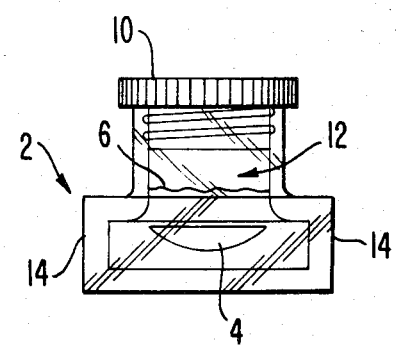
FIG. 3 is an end view of the container according to the invention.

FIG. 2 shows a side view of the container 2 and illustrates how the optical element 4 resides in the cavity of the container. The portion of the container immediately under the cylindrical neck 8 may preferably contain a label 18 for carrying information such as the name of the manufuacturer and the characteristics of the optical element 4.

The surfaces 14 and 16 are preferably optically flat. This configuration has no optical power and thus simplifies testing. It is possible, however, to provide curvature to these surfaces. If the curvature is accurate and known, an appropriate correction to the measured power may be made. Furthermore, if the index of refraction of the liquid 6 matches that of the container material, the interior surfaces may be of any shape since they will not have optical power.

FIG. 4 shows the container of the invention located in an optical testing apparatus. A light source 20 illuminates a collimating lens 22 so that the container 2 is illuminated with collimated light. Light passes through the optical surfaces 16 and through the optical element 4 which is located between the surfaces. A second lens 24 forms an image of the light source 20 on a screen 26 after reflection from mirror 32, and the position of the lens 24 or the lens 22, required to produce the image, gives and indication of the optical power of the element 4. Since the optical element 4 is suspended in a fluid 6, the actual power of the lens 4 in air may be determined by multiplying the power determined in accordance with the apparatus shown in FIG. 4 by a predetermined factor. This factor is determined on the basis of the difference between the index of refraction of the liquid 6 and that of the lens 4.

FIG. 5 shows how the profile of the lens 4 may be measured. Light from the source 20 is collimated by the lens 22 and is directed onto a first mirror 28. Light reflected from the mirror 28 is directed onto a first of the optical surfaces 14, through the lens 4, through the second of the optical surfaces 14, onto a second mirror 30, through lens 24, onto a reflective surface 32 and onto the screen 26. The lens 22 or lens 24 may be moved to focus an image of the profile of lens 4 on the screen 26. The practitioner may then view the screen 26 to determine whether the curvature of the element 4 and the cord and sigital dimension of the element are acceptable.

If the depth of field of projection lens 24 is small, selected profiles may be examined by moving lens 24 to focus a selected profile on screen 26 for measurement.

It will be appreciated that the only change required between the test shown in FIG. 4 and that shown in FIG. 5 is the position of the light source and collimating lens 22 with respect to the container 2 and the mirrors 28 and 30.

FIG. 6 is a plan view of the instrument shown in FIGS. 4 and 5. This demonstrates how the portion of the container 2 having the optical element 4 therein is aligned between the mirrors 28 and 30.

FIG. 7 is an illustration of indicia which may be provided on the screen 26 to permit a direct measurement of the image of the optical element 4 to determine the curvature of the lens and the cord and sagital lengths. A first set of curves 34 represents a plurality of standard curvatures which may be compared with the image of the profile of the lens 4. A linear measurement scale 36 permits the determination of the sagital depth of the optical element 4, and a linear measurement scale 38 permits determination of the cord length of the optical element 4.

The indicia 34, 36, and 38 may also be etched into one of the optical surfacs 14 so that the lens 24 projects an image thereof onto the screen 26 along with an image of the lens 4.

Figure 8:
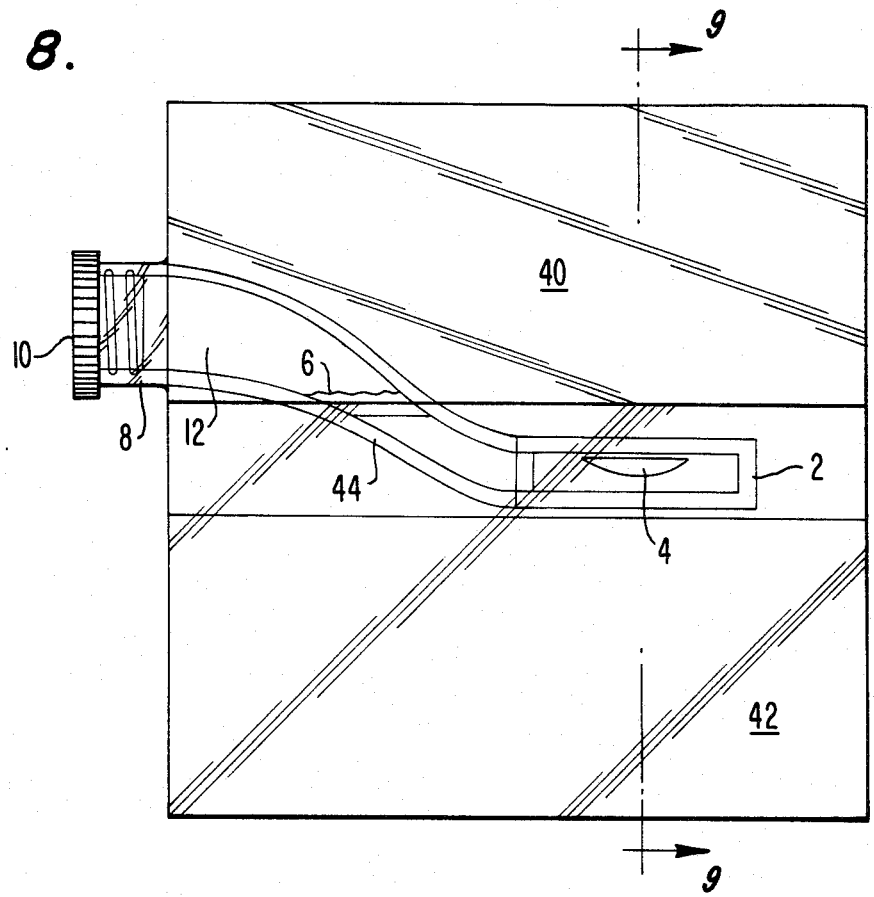
FIG. 8 is a front view of a second embodiment of a container embodying the principles of the invention.
Figure 9:
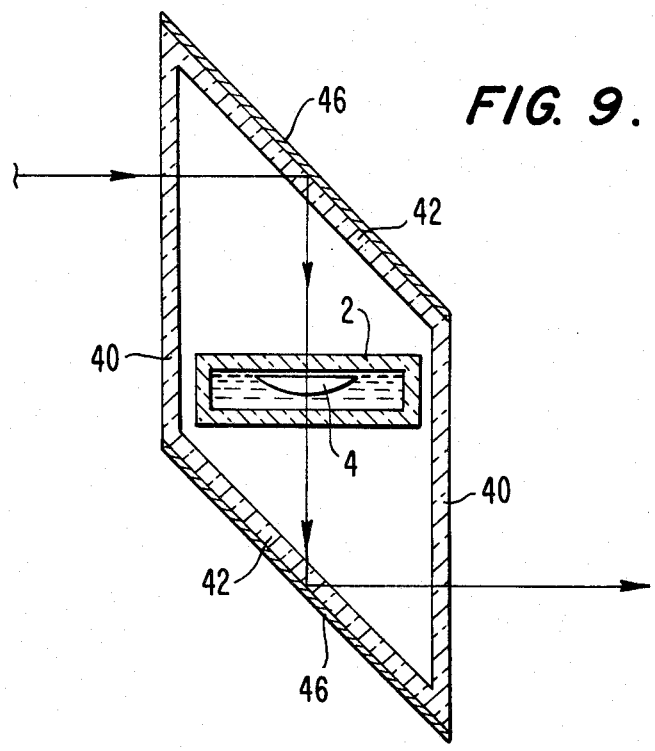
FIG. 9 is a cross section taken along line 9—9 of FIG. 8.

A second embodiment of the invention is shown in FIGS. 8 and 9. In accordance with this embodiment, the container 2 is located within a cavity formed by a first set of parallel elements 40 and a second set of parallel elements 42. End elements (not shown) may be used to provide a completely closed cavity for receiving the container 2, if desired.

The container 2 is supported between the surfaces 40 and 42 by any known means, and a tube 44 communicates with the cylindrical neck 8. This arrangement permits the void 12 to be located adjacent and vertically above the portion of the container 2 having the optical element 4 therein.

FIG. 9 shows how the surfaces 42 operate in a manner similar to the mirrors 28 and 30 shown in FIGS. 4 through 6 These surfaces may be coated with a reflective material 46. Also, the interior surfaces of the elements 42 may be coated with an anti-reflective coating to prevent liqht loss. The incident light beam thus reflects off a first surface 42 toward the container 2 and from a second surface 42 to a screen.

The embodiment shown in FIG. 9 comprises two separate parts with the container 2 being enclosed by the surfaces 40 and 42. In an alternative embodiment, a solid prism having exterior surfaces in the configuration of surfaces 40 and 42 would have a hollow chamber for receiving the optical element 4. A passageway would be bored through the solid material, such a plastic, in a configuration similar to that of the tube 44 and the neck 8. This embodiment would operate in substantially the same manner as does the embodiment shown in FIGS. 8 and 9.

It will thus be appreciated that a novel container has been shown and described wherein an optical element may be stored in a sterile chamber and subjected to optical testing without the necessity of removing it from the chamber. The optical test is not affected by any air-liquid interfaces caused by a void in the chamber.

Modifications within the scope of the appended claims will be apparent to those of skill in the art.

What is claimed is:

1. Apparatus for storing an optical element comprising a container having a cavity for receiving said optical element, and opening means communicating with said cavity for allowing said element to be inserted and removed from said cavity, wherein said cavity comprises a first set of opposed optical surfaces for allowing optical examination of said element in a first direction and a second set of optical surfaces angularly related with said first set for allowing optical examination of said optical element in a second direction and wherein said opening means comprises an elongated hollow element displaced vertically and horizontally from said cavity and extending to a height above the uppermost one of said surfaces whereby said cavity may be completely filled with a liquid.

2. The apparatus of claim 1 wherein one end of said hollow element includes a closure and wherein a second end of said hollow element communicates with said cavity.

3. The apparatus of claim 2 wherein said sets of optical surfaces have substantially planar outer faces.

4. The apparatus of claim 2 wherein said sets of optical surfaces have substantially zero optical power.

5. Testing apparatus comprising the apparatus of claim 1 and further comprising a light source on one side of said cavity for directing a beam of light through said cavity and said optical element in one of said directions and means for analyzing the beam after passing said optical element to determine a property of said element.

6. The apparatus of claim 5 wherein said means for analyzing includes a screen and projection means to project an image of said lens onto said screen.

7. The apparatus of claim 6 wherein said projection means projects an image of the profile of said optical element onto said screen.

8. The apparatus of claim 5 wherein said means for analyzing determines the optical power of said element.

9. The apparatus of claim 1 whrein said first and second sets of optical surfaces form a prism and wherein said cavity is formed by a hollow portion of said prism.

10. The apparatus of claim 9 wherein said prism comprises rectangular surfaces.

11. The apparatus of claim 8 further comprising two reflective surfaces adjacent respective optical surfaces for directing light incident on one of said reflective surfaces through said cavity and toward the other of said reflective surfaces.

12. The apparatus of claim 6 wherein said screen has indicia for determining physical size of said optical element.

13. The apparatus of claim 12 wherein one of said surfaces has indicia, an image of which is projected onto said screen.

14. A container for holding a lens in a fluid-filled cavity and for permitting optical examination of said lens comprising a plurality of surfaces forming said cavity, at least one of said plurality of surfaces being transparent, and neck means adjacent said cavity for allowing insertion and removal of said lens and said fluid, said neck means comprising an elongate hollow element horizontally displaced from said cavity, communicating with said cavity, and extending to a height above the uppermost one of said plurality of surfaces, said hollow element being closed at a location above said height.

* * * * *